Figure 1:
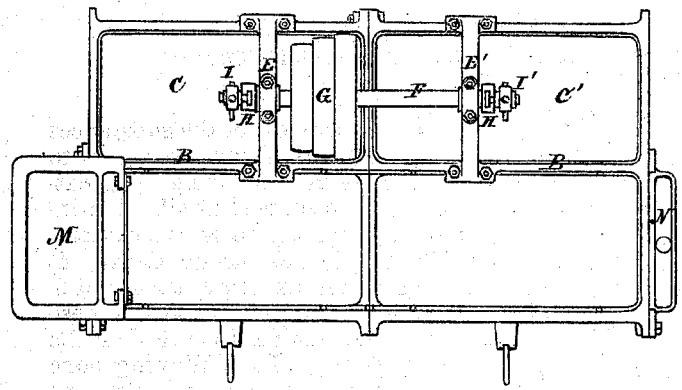

A. HUET & A. GEYLER.

Improvement in Separating Ores.

No. 124,578.  Patented March 12, 1872.

Witnesses.  Inventors.

UNITED STATES PATENT OFFICE.

ALFRED HUET AND ALFRED GEYLER, OF PARIS, FRANCE.

IMPROVEMENT IN SEPARATING ORES.

Specification forming part of Letters Patent No. 124,578, dated March 12, 1872.

*To whom it may concern:*

Be it known that we, ALFRED HUET and ALFRED GEYLER, of Paris, France, have invented certain new and useful Improvements in the Method of Separating Ores and other substances, of which the following is a specification:

Our invention relates to a method of separating into groups fragments or granules of dissimilar substances, which may be mingled together either naturally or artificially, provided these substances differ from one another in density.

In the following description we have taken metalliferous ores as a type; but it will be understood that the process and apparatus can be applied to all products or mixtures of substances of unequal densities—as, for example, to the washing of carbonate of lead and oxides of lead prepared artificially, the washing of the residuums of copper, zinc, iron, and other foundries or works, the washing of coals, phosphates of lime, borates, animal-black, &c.

The invention is based on the following principle: When substances of different densities, broken into small pieces of about equal size, are mixed together and put into a liquid, and are there maintained in a state of suspension by means of very rapid vertical oscillations imparted to the liquid, they arrange themselves, according to their different densities, in distinct layers or stratums, one above the other, the heavier substances being below the lighter. If on these layers thus held in suspension there be cast a handful of the primitive or original mixture, each layer or stratum will allow those grains to penetrate or pass through it which have a density greater than or equal to its own density, while it will offer a barrier to the passage of grains of a less density.

Our invention consists in the method hereinafter described of carrying into effect this principle. We provide a sieve or grating whose holes are of slightly greater diameter than the diameter of the holes through which the grains of the mixture to be operated on have previously passed; and on this grating or sieve we place an artificial bed of granulated matter, composed of grains of sufficiently greater size than the holes in the sieve not to pass through such holes. This bed, it should be well understood, must be composed of a substance having a density equal to that of the heaviest of the substances to be separated; for it is always necessary to commence with those grains having the greatest density in order to succeed at all. For instance, if we are to operate on an ore containing galena (density 7) and blende (density 4) with ordinary gangues, having a density of 2, it will be necessary, in order to isolate these substances from one another, to spread on the sieve a bed of galena, which, allowing none of the substances to penetrate it except the galena, will repel the blende and gangues. The galena, penetrating the bed, will gradually arrive at the grating, will pass through its holes, and will fall into the receptacle below. The after separation of the blende from the gangues is effected by carrying on the same operation on a bed of blende. Thus, with one sieve and with successive changes of beds, the separation of mixtures of any number of substances may be effected. In practice, in order to carry forward the process rapidly and economically, we make use of an apparatus having as many compartments as there are different classes of substances to separate. In the accompanying drawing we have represented a two-compartment apparatus. Two or more of these apparatuses may be placed side by side, so as to increase the number or series of compartments to any desired extent.

Figure 3:
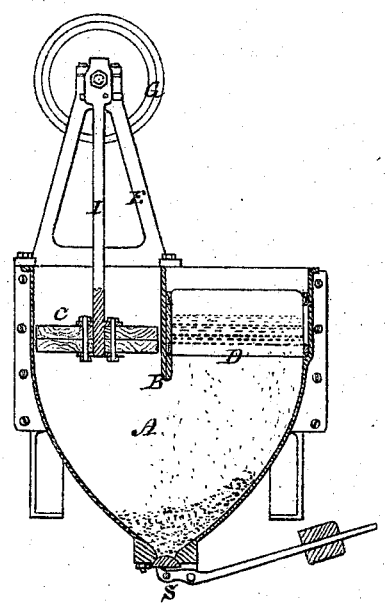
Figure 2:
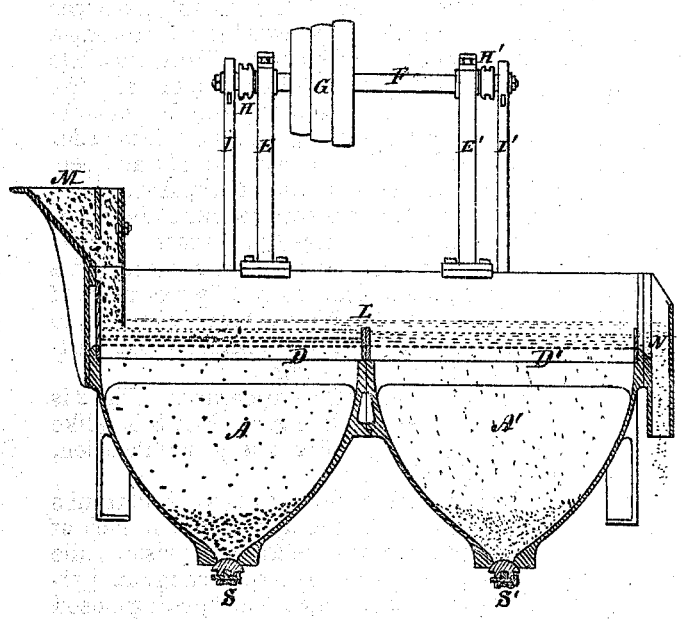
Figure 4:
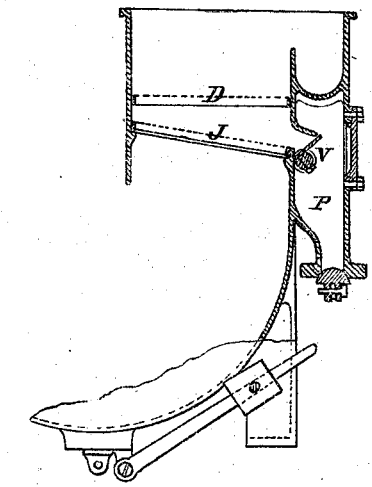

Figure 1 is a plan of the apparatus. Fig. 2 is a vertical section on line $x\,x$. Fig. 3 is a like section on line $y\,y$. Fig. 4 is a modification, hereinafter referred to.

The apparatus is composed of two similar tubs or receptacles, A A', the upper part of each of which has the form of a rectangular prism, while the lower part resembles a quadrangular pyramid, at the apex of which is an opening closed by a counterpoised valve, S S'. The prism, which terminates the upper part of each receptacle, is divided into two equal parts by a partition, B. On one side of the partition is a piston, C. On the other side is the filtering-sieve D, on which the work of separating the ores takes place. On the receptacle are fixed two standards, E E', sustaining in suitable bearings the shaft F, which carries between the two standards a driving-cone, G, which allows of changes of speed; and at each of the ends of the shaft are small crank-disks or eccentrics H H', to which are attached the rods I I' of the pistons G G'. These eccentrics and connecting-rods are so constructed as to allow the movement of each piston to be varied and changed independently of the other. In each apparatus the gratings D D' are separated by a low barrier or cross-partition, L, and a cock, corresponding to each compartment, conducts on the piston a small but continuous jet of water.

The operation of the machine is as follows: The apparatus is first filled with water, the artificial beds having been spread on the surfaces of the sieves, and the velocity and length of strokes of the pistons is regulated according to the nature of the substance to be operated on. The crude matter or mixture contained in the hopper M is then introduced at one or the other end of the apparatus, and spreads itself out on the sieves and artificial beds placed on the same, which permit those products or substances which are to be separated from the others to filter down through the sieves into the bottom of the receptacles A A', while the lighter substances are carried off from the apparatus by the conduit N on the side opposite to that on which the hopper M is situated.

With a two-compartment apparatus three substances of different densities may be separated from one another. By coupling together two apparatuses four compartments will be obtained, and a mixture containing five different substances may be acted on; and as the number of compartments increases so also does the capacity of the apparatus to separate more complex mixtures.

In case it is desired to separate particles of small dimensions—having, for instance, a diameter less than fifteen millimeters—the opening of the valve S would cause the loss of a considerable quantity of water, which, in certain cases —when, for instance, water is scarce—might occasion inconvenience. To obviate this difficulty the use of the valve may be dispensed with, and a double sieve can be employed— that is to say, under the filtering-sieve D which supports the artificial bed there can be placed a second grating or sieve, J, as shown in Fig. 4, with holes sufficiently small to prevent the particles which filter through from falling to the bottom of the receptacle A. This second grating should be inclined or sloping in such manner as to conduct the particles it receives into a pocket, P, placed at the bottom of the slope, from which they may be drawn through a valve at the bottom of the pocket, care being taken to first close the flap-valve V, which prevents escape of water from the body of the apparatus into the pocket.

Having described our invention, and the manner in which the same is or may be carried into effect, what we claim, and desire to secure by Letters Patent, is—

The method of separating ores and other substances, as herein shown and described, whereby the granulated mass to be operated on is conducted to a sieve covered with an artificial bed of granulated matter, whose grains are of a larger size than the holes in the sieve, and of a density greater than all of the component substances of the mass except the one having the greatest density, which latter will be caused, by the continued oscillations of the liquid in which the mass is held in suspension, to filter down through the sieve and superincumbent artificial bed into the receiver below, as set forth.

ALFRED HUET.
ALFRED GEYLER.

Witnesses:
DUMAS,
CHARLES ASHÉ.